United States Patent
Kadam et al.

(10) Patent No.: US 12,024,673 B2
(45) Date of Patent: Jul. 2, 2024

(54) FILTER CAKE REMOVAL COMPOSITIONS AND METHODS OF MAKING AND USING SAME

(71) Applicant: Halliburton Energy Services, Inc., Houston, TX (US)

(72) Inventors: Sunita S. Kadam, Pune (IN); V. Ramireddy Devarapalli, Pune (IN); Rajashree Lad, Pune (IN)

(73) Assignee: Halliburton Energy Services, Inc., Houston, TX (US)

( * ) Notice: Subject to any disclaimer, the term of this patent is extended or adjusted under 35 U.S.C. 154(b) by 36 days.

(21) Appl. No.: 17/537,077

(22) Filed: Nov. 29, 2021

(65) Prior Publication Data

US 2023/0167352 A1    Jun. 1, 2023

(51) Int. Cl.
*C09K 8/528* (2006.01)
*C09K 8/06* (2006.01)
*E21B 37/06* (2006.01)

(52) U.S. Cl.
CPC ............... *C09K 8/528* (2013.01); *C09K 8/06* (2013.01); *E21B 37/06* (2013.01); *E21B 2200/08* (2020.05)

(58) Field of Classification Search
None
See application file for complete search history.

(56) References Cited

U.S. PATENT DOCUMENTS

| | | | |
|---|---|---|---|
| 9,862,874 B2 | 1/2018 | Kadam et al. | |
| 2014/0303047 A1 | 10/2014 | McDaniel et al. | |
| 2016/0304765 A1* | 10/2016 | Kadam | C09K 8/72 |
| 2020/0032135 A1 | 1/2020 | Zhou et al. | |
| 2020/0392392 A1* | 12/2020 | Geri | E21B 21/003 |

FOREIGN PATENT DOCUMENTS

WO    2020231400 A1    11/2020

* cited by examiner

*Primary Examiner* — Christopher M Rodd
(74) *Attorney, Agent, or Firm* — Conley Rose, P.C.; Rodney B. Carroll

(57) ABSTRACT

A breaker composition comprising: (i) an acid precursor, (ii) a delaying agent and (iii) an aqueous fluid wherein the breaker composition has an effective operating temperature range of from about 25° C. to about 180° C. A wellbore servicing system comprising (a) an aqueous-based drilling fluid, wherein the aqueous-based drilling fluid forms water-wet solids in the wellbore; and (b) a breaker composition comprising (i) an acid precursor, (ii) a delaying agent and (iii) an aqueous fluid. A method of dissolving a filtercake comprising contacting the filtercake with a breaker solution comprising (i) an acid precursor, (ii) a delaying agent and (iii) an aqueous fluid wherein the filtercake comprises calcium carbonate.

21 Claims, 1 Drawing Sheet

FILTER CAKE REMOVAL COMPOSITIONS AND METHODS OF MAKING AND USING SAME

FIELD

This application relates to the recovery of natural resources from a wellbore penetrating a subterranean formation, and more specifically this application relates to compositions and methods for filter cake removal.

BACKGROUND

Natural resources such as gas, oil, and water residing in a subterranean formation can be recovered by drilling wells into the formation. Well drilling involves drilling a wellbore down to the formation while circulating a drilling fluid or mud through the wellbore. Various types of drilling fluids, also known as drill-in fluids when used in the productive interval, have been used in well drilling, such as water-based fluids, mineral oil-based fluids, and synthetic oil-based fluids. Such drilling fluids form a thin, slick filter cake on the formation face that provides for successful drilling of the wellbore and that helps prevent loss of fluid to the subterranean formation.

In hydrocarbon recovery, several stages may be used to produce oil found in subterranean formations. The first stage, which is known as the primary production stage, allows the oil to flow into a production well (or wells) under natural forces. At first, the natural forces may be sufficient to drive the oil to the surface where it is recovered. However, at some point, pumps may be required to displace the oil from the wellbore to the surface. A secondary recovery operation thus is typically performed to recover additional amounts of the oil from the reservoir. A common secondary recovery operation known as secondary flooding involves injecting a fluid such as water into a so-called injection well (or wells) to drive oil in the formation to the production well (or wells). Tertiary recovery operations such as tertiary flooding may also be used to drive the remaining oil from the formation to the production well.

Typically, the presence of the filter cake on the face of the subterranean formation can adversely affect the flow of fluid though the injection wells and the production wells. For example, pump fracturing pressures required to inject past the filter cake are higher than desirable for achieving good sweep efficiency of the oil reservoir fluid filter-cake clean-up is achieved by using slow releasing acids, chelating agents, oxidizers, enzyme treatments, or combinations of these materials. Ester-based products releasing in-situ acids are the materials of choice in the industry for their neutral nature at surface and easy operation. These esters mostly get activated at elevated temperatures to release acid by hydrolysis however, the rate of acid release increases with increasing temperature. This can become undesirable as at sufficiently high temperature, for example in wellbores located in the Middle East, the rate of acid release become uncontrolled. Therefore, their application at high temperature remains challenging. Thus, an ongoing need exists for filter-cake breaker compositions that are efficient at high temperatures.

BRIEF DESCRIPTION OF DRAWINGS

For a more complete understanding of this disclosure, reference is now made to the following brief description, taken in connection with the accompanying drawings and detailed description, wherein like reference numerals represent like parts.

The FIGURE is a process flow diagram of an exemplary method of the present disclosure.

DETAILED DESCRIPTION

Disclosed herein is a high-temperature filtercake breaking system. In some embodiments, the high-temperature filtercake breaking system comprises an acid precursor, a delaying agent and an aqueous fluid. In some embodiments, the high-temperature filtercake breaking system expands the temperature range at which the filtercake breaking system is effective thus expanding the range of utility of the system. Hereinafter the high-temperature filtercake breaking system is designated HT-BS.

In some embodiments, the HT-BS may be used for the removal of a water-based filtercake. In other embodiments, the HT-BS may be used for the removal of a water-based filtercake that has been contaminated with oil wet components (e.g., crude oil). Hereinafter, the disclosure will refer to the use of the HT-BS for the removal of a water-based filtercake although the removal of other compositions of the type disclosed herein are also contemplated. The HT-BS may be placed downhole and used to service a wellbore, for example providing for removal of a filter-cake. Each of the components of the HT-BS as well as methods of using same will be described in more detail herein.

In some embodiments, the HT-BS comprises an acid precursor. Herein an acid precursor is defined as a material or combination of materials that provides for delayed release of one or more acidic species. Such acid precursors may also be referred to as time-delayed and/or time-released acids. In embodiments, acid precursors comprise a material or combination of materials that may react to generate and/or liberate an acid after a period of time has elapsed. The liberation of the acidic species from the acid precursor may be accomplished through any means known to one of ordinary skill in the art with the benefits of this disclosure and compatible with the user-desired applications.

In embodiments, acid precursors may be formed by modifying acids via the addition of an operable functionality, component, or substituent, physical encapsulation or packaging, or combinations thereof. The operable functionality component or substituent may be acted upon in any fashion (e.g., chemically, physically, thermally, etc.) and under any conditions compatible with the components of the process in order to release the acid at a desired time and/or under desired conditions such as in situ wellbore conditions. In some embodiments, the acid precursor may comprise at least one modified acid (e.g., having an operable functionality, encapsulation, packaging, etc.) such that when acted upon and/or in response to pre-defined conditions (e.g., in situ wellbore conditions such as temperature, pressure, chemical environment), an acid is released. In some embodiments, the acid precursor may comprise an acidic species that is released after exposure to an elevated temperature such as an elevated wellbore temperature. In some embodiments, the acid precursor comprises a material which reacts with one or more components of the HT-BS (e.g., reacts with an aqueous fluid present in the HT-BS) to liberate at least one acidic species.

In some embodiments, the acid precursor comprises a reactive ester. Hereinafter, for simplicity, the remainder of the disclosure will focus on the use of a reactive ester as the acid precursor with the understanding that other acid precursors may be used in various embodiments. The reactive ester may be converted to an acidic species by hydrolysis of the ester linkage, for example by contact with water present in the aqueous fluid of the HT-BS and/or water present in situ in the wellbore.

Suitable acid precursors for use in the present disclosure include, without limitation, lactic acid derivatives such as methyl lactate, ethyl lactate, propyl lactate, butyl lactate; esters and/or formates that are water soluble or partially soluble such as ethylene glycol monoformate, ethylene glycol diformate, diethylene glycol diformate, glyceryl monoformate, glyceryl diformate, glyceryl triformate, triethylene glycol diformate; formate esters of pentaerythritol; esters or polyesters of glycerol including, but not limited to, tripropionin (a triester of propionic acid and glycerol), trilactin, esters of acetic acid and glycerol such as monoacetin, diacetin, and triacetin; esters of glycolic acid such as ethyl or methyl or propyl or butyl glycolate or esters of glycolic acid and polyols such as glycerol and glycols, aliphatic polyesters; poly(lactides); poly(glycolides); poly(ε-caprolactones); poly(hydroxybutyrates); poly(anhydrides); aliphatic polycarbonates; poly(amino acids), and polyphosphazenes; or copolymers thereof: poly(ortho esters); orthoesters (which may also be known as "poly ortho ethers" or "ortho ethers"); esters of oxalic acid; aliphatic polyesters; poly(lactides); poly(glycolides); poly(ε-caprolactones); poly(hydroxybutyrates); poly(anhydrides); poly(amino acids); esters of propionic acid; esters of butyric acid; esters of monochloroacetic acid; esters of dichloroacetic acid; esters of trichloroacetic acid; derivatives thereof; or a combination thereof. Other suitable acid precursors include, without limitation, halide esters and esters of acids such as esters of nitric acid, sulphuric acid, sulphonic acid, sulphinic acid, phosphoric acid, phosphorous acid, phosphonic acid, phosphinic acid, sulphamic acid and the like.

In some embodiments, the acid precursor comprises diethylene glycol diformate, diethylene glycol monoformate, monoethylene monoformate, monoethylene diformate, ethyl lactate, methyl lactate, tri-n-propyl orthoformate, tri-n-butyl orthoformate, or a combination thereof.

The choice and physical form of a suitable acid precursor may depend on a variety of factors including but not limited to the time at which liberation of the acidic species is desired relative to the placement of the HT-BS in the wellbore; the environmental conditions presented; the conditions within the wellbore; the temperature of the wellbore section in which the HT-BS is being placed; the composition of the formation water, etc.

The acid precursor may be present the HT-BS in an amount ranging from about 5 vol. % to about 50 vol. % based on total volume of the composition, alternatively from about 5 vol. % to about 40 vol. %, alternatively from about 8 vol. % to about 30 vol. %, alternatively from about 10 vol. % to about 25 vol. %.

Aqueous fluids that may be used in the HT-BS include any aqueous fluid suitable for use in subterranean applications. For example, the HT-BS may comprise water or a brine. Suitable brines include, but are not limited to: KCl, NaCl, NaBr, $CaCl_2$, $CaBr_2$, $ZnBr_2$, sodium formate, potassium formate, cesium formate, combinations thereof and derivatives thereof. The specific brine used may be dictated by the desired density of the wellbore servicing fluid. Denser brines may be useful in some instances. The density of the aqueous fluid, and likewise the density of the HT-BS, may be selected and adjusted to meet one or more user and/or process goals. In some embodiments, the aqueous fluid comprises a brine, alternatively NaBr. The brine may be present in an amount of from about 40 volume/volume % (vol./vol. %) to about 95 vol./vol. % based on the total volume of the composition, alternatively from about 50 vol./vol. % to about 90 vol./vol. %, or alternatively from about 60 vol./vol. % to about 85 vol./vol. %. Alternatively, the aqueous fluid may comprise the balance of the HT-BS after considering the amount of the other components used.

In one or more embodiments, the HT-BS comprises a delaying agent. In such embodiments, the delaying agent functions to decrease the rate of hydrolysis of the ester present in the HT-BS (e.g., acid precursor) at higher temperatures. For example, an HT-BS of the type disclosed herein decreases the rate of ester hydrolysis by from about 1.5 times to about 30 times, alternatively from about 2 times to about 25 times or alternatively from about 2 times to about 20 times at temperatures of from about 25° C. to about 180° C., alternatively form about 30° C. to about 180° C., alternatively from about 40° C. to about 160° C. or alternatively from about 45° C. to about 150° C.

In one or more embodiments, the delaying agent comprises an inorganic chelating salt. Without being limited by theory, an inorganic chelating salt may interact with the acid precursor to delay ester hydrolysis. In embodiments, the delaying agent comprises a phosphate salt. Alternatively, the delaying agent comprises sodium hexametaphosphate (SHMP), monosodium phosphate, disodium phosphate, sodium triphosphate, or a combination thereof. For example, the delaying agent may comprise SHMP. A delaying agent may be included in the HT-BS in an amount of from about 0.1 weight/volume % (wt./vol. %) to about 30 wt./vol. % based on the total weight and volume of the composition, alternatively from about 0.5 wt./vol. % to about 25 wt./vol. % or alternatively from about 1 wt./vol. % to about 20 wt./vol. %.

In some embodiments, a HT-BS comprises an acid precursor, an aqueous fluid and a delaying agent. In other embodiments, a HT-BS comprises an acid, an aqueous fluid and a delaying agent.

In some embodiments, the HT-BS may comprise a formate ester/lactate ester. Hydrolysis of a formate ester is known to be rapid in comparison to the hydrolysis of acetates or propionates under similar hydrolysis conditions. Consequently, the formate when hydrolyzed produces formic acid which in turn lowers the pH of the HT-BS and increases the hydrolysis of additional formate ester. In some embodiments, the HT-BS comprises a formate/lactate ester which functions as the acid precursor. In some embodiments, a HT-BS comprises a formate/lactate ester and an inorganic chelating salt (e.g., SHMP).

The components of the HT-BS (e.g. acid precursor, aqueous fluid, delaying agent) may be combined using any mixing device compatible with the composition. In some embodiments, the components of the HT-BS are combined at the well site; alternatively, the components of the H T-BS are combined off-site and are transported to and used at the well site. The contacting of the components of the HT-BS may initiate hydrolysis of the acid precursor by the aqueous fluid, for example via hydrolysis and dissociation of ester groups present in the precursors. Release of (one or more acidic species from the acid precursor will decrease the pH of the HT-BS and the delaying agent will decrease the rate hydrolysis of the acid precursors at temperatures ranging from about 30° C. to about 180° C. Consequently, a HT-BS of the present disclosure may be characterized by an effective operating temperature ranging from about 30° C. to about 180° C. alternatively, from about 40° C. to about 160°

C. or alternatively from about 45° C. to about 150° C. The effective operating temperature is the temperature range wherein the breaker solution promotes dissolution of greater than about 50% of the filtercake.

A schematic depiction of a method of the present disclosure 100 is presented in the FIGURE. With reference to the FIGURE, in general a drilling mud is introduced to a wellbore with components sufficient to form a filtercake 10 resulting a well having a filter cake 20. The method further comprises the introduction of a HT-BS 30 and a delayed initiation of hydrolysis of the HT-BS esters 40. In some embodiments, the filtercake is dissolved by the HT-BS 50.

In some embodiments, a method of servicing a wellbore comprises drilling a wellbore in a subterranean formation and introducing to the formation a water-based servicing and/or drilling fluid or an aqueous-based servicing wherein water-coated/wet solids (e.g., filtercake, drill cuttings, etc.) are formed as a result. It is to be understood that "subterranean formation" encompasses both areas below exposed earth and areas below earth covered by water such as ocean or fresh water.

In some embodiments, the introduction of a water-based fluid (e.g., drilling fluid) may result in the deposition of the water-wet solids on the sides or surfaces within the wellbore. The water-wet solids may be deposited on and/or components of the filter cake, a formation face, a fracture face, a perforation, or on a screen (e.g., a gravel pack screen) or another piece of equipment located in the wellbore or subterranean formation. In some embodiments, a surface comprising water-wet solids is contacted with an HT-BS of the type disclosed herein to facilitate removal of the water-wet solids from the surface.

The method further comprises contact of the water-wet solids with a HT-BS as described herein to effect removal of the water-wet solids and/or conversion of the solids from oil-wet to water-wet. For example, a HT-BS may be placed in a wellbore and contacted with a filtercake or other water-wet solids located down hole. The water-wet solids when contacted with a HT-BS of the type disclosed herein may become degraded by the HT-BS. For example, upon becoming water-wet, acid from the HT-BS may contact and decompose one or more components of the water-wet solids (e.g., calcium-based components such as calcium carbonate contained in the filtercake). The HT-BS disclosed herein may result in the removal of water-wet solids (e.g. filtercake) at high temperatures (e.g., 30° C. to 180° C.) while minimizing damage to the formation or to allow for other servicing operations. Following treatment with a HT-BS, production can then take place, if desired or appropriate, as for example in a hydrocarbon-producing well.

EXAMPLES

The presently disclosed subject matter having been generally described, the following examples are given as particular embodiments of the subject matter and to demonstrate the practice and advantages thereof. It is understood that the examples are given by way of illustration and are not intended to limit the specification or the claims in any manner.

Example 1

The ability of a HT-BS to decrease the rate of hydrolysis of an ester was investigated in potassium chloride brine. Specifically, only HT-BS and a HT-BS comprising SHMP were prepared and rate of dissolution of calcium carbonate measured. The sample components along with the rates of hydrolysis at 70° C. are presented in Table 1.

TABLE 1

| Component | Only HT-BS | HT-BS with SHMP |
|---|---|---|
| 8.6 ppg KCl Brine | 255 ml | 255 ml |
| SHMP in 8.6 ppg KCl Brine | 0 ml | 0.058 w/v % |
| HT-BS | 45 ml | 45 ml |
| Calcium Carbonate | 2 g | 2 g |
| Rate of hydrolysis, moles/sec | $6.65 \times 10^{-6}$ | $2.60 \times 10^{-6}$ |

With reference to Table 1, the presence of SHMP in the formulation decreased the rate of hydrolysis.

Example 2

The ability of a HT-BS to decrease the rate of hydrolysis of an ester was investigated in sodium bromide brine. Specifically, only HT-BS and a HT-BS comprising SHMP were prepared in sodium bromide brine and rate of dissolution of calcium carbonate measured. The sample components along with the rates of hydrolysis at 90° C. are presented in Table 2.

TABLE 2

| Component | Only HT-BS | HT-BS with SHMP | HT-BS with SHMP | HT-BS with SHMP | HT-BS with SHMP |
|---|---|---|---|---|---|
| 10 ppg NaBr Brine | 255 ml | 255 ml | 255 ml | 255 ml | 255 ml |
| SHMP (w/v %) | 0 | 0.05 | 0.1 | 0.25 | 0.5 |
| HT-BS (v/v %) | 15 | 15 | 15 | 15 | 15 |
| Calcium Carbonate | 2 g | 2 g | 2 g | 2 g | 2 g |
| Rate of hydrolysis, moles/sec | $3.50 \times 10^{-5}$ | $4.68 \times 10^{-6}$ | $3.12 \times 10^{-6}$ | $2.61 \times 10^{-6}$ | $2.58 \times 10^{-6}$ |

With reference to Table 2, the presence of SHMP in the formulation decreased the rate of hydrolysis. It was also noted that an increase in the concentration of SHMP further delayed the rate of ester hydrolysis. This indicates that hydrolysis rate can be tuned to meet some user and/or process goal.

Example 3

Test solutions were prepared as described in Table 3 and calcium carbonate dissolution studies were performed at room temperature (25° C.) and at 90° C. The observed results are presented in Table 3 and Table 4.

TABLE 3

|  | Test Solution 1<br>Deionized (DI) water +<br>HT-BS + CaCO₃ | Test Solution 2<br>DI water + HT-BS +<br>SHMP + CaCO₃ |
|---|---|---|
| Initial Test solutions @ 25° C. | Cloudy white solution | |
| Test solutions After 72 hrs @ 25° C. | Complete dissolution of added CaCO₃ | Solid mass formation in test solution indicating interaction of SI-IMP with HT-BS and CaCO₃ |

TABLE 4

|  | Test Solution 3<br>DI water + HT-BS +<br>CaCO₃ | Test Solution 4<br>DI water + HT-BS +<br>SHMP + CaCO₃ |
|---|---|---|
| Initial Test solutions @ 25° C. | Cloudy white solution | |
| After heating at 90° C., 24 hrs. | Clear solution indicating complete dissolution of added CaCO₃ at elevated temperature | |

The results demonstrate that the addition of SHMP to HT-BS delayed the dissolution of CaCO₃ by forming precipitate/complex which eventually dissociate/dissolve at elevated temperature. This indicate that the interaction of SHMP and HT-BS will delay the dissolution of filter cake but will not cause the formation damage.

Example 4

The ability of a HT-BS of the type disclosed herein to effect filter cake removal was further investigated. The formulation used for the filter cake dissolution as well as the filter cake breakthrough study is displayed in the following Table 5.

TABLE 5

Reservoir drilling fluid formulation used
for Oven soak and Breakthrough test

| Component | Quantity |
|---|---|
| Deionized water | 324 ml |
| Potassium Chloride | 10.33 g |
| A crosslinked starch (fluid loss control agent) | 8.75 g |
| A Xanthan gum polymer viscosifier | 1.00 g |
| A CaCO₃ particulate bridging material (Various mesh sizes) | 40 g |
| An alkaline buffer (magnesium oxide) | 1.00 g |
| Mixing and aging parameters | |
| BHR Mixing (Mixer Type & Speed) | Multimixer, 11600 rpm |
| Mixed Volume | 1 bbl |
| Rolling Temperature/Time | 66° C./16 hrs |
| Aging Condition | Dynamic |
| AHR Mixing | Multimixer, 5 min |
| Properties | |
| Mud weight | 9.2 ppg |
| Viscometer, FANN 45 Rheology at 120° F. | After Hot rolling |
| 600 rpm | 52 |
| 300 rpm | 39 |
| 200 rpm | 33 |
| 100 rpm | 24 |
| 6 rpm | 9 |
| 3 rpm | 7 |
| Plastic Viscosity, cp | 13 |
| Yield Point, lbs/100 ft² | 26 |
| 10 sec, lb/100ft² | 7 |
| 10 min, lb/100ft² | 8 |

Filter cake was built up on 20-micron ceramic disk (soaked in DI water prior to test) for 60 minutes with the fluid (prepared as shown in Table 5) in 175 ml HTHP cell at desired test temperature following the filter cake build up procedure.

The filtercake soak tests were carried out with 15 v/v % HT-BS with and without addition of SHMP salt at 90° C. 8.4 ppg KCl brine solution used as base solution for preparation of the HT-BS. From the soak test studies, it indicated that for only the HT-BS, it took about 48 hrs hours for the complete dissolution of the filtercake. However, in the case of the HT-BS of the present disclosure containing SHMP salt (10 w/v %), it took more than 72 hours for the complete dissolution of filter cake. So, these dissolution studies confirm the delay in dissolution of filter cake in the presence of the delaying agent, the SHMP salt. But eventually SHMP doesn't resisting the complete dissolution of the filter cake. The observed filtercake and time durations of filter cake dissolutions in both solutions at 90° C. are presented in Table 6. This indicated the delayed dissolution of filtercake using an HT-BS of the type disclosed herein.

TABLE 6

|  | Only HT-BS | HT-BS with SHMP |
|---|---|---|
| pH after test | 1.98 | 2.77 |
| Filter cake dissolution | Complete dissolution of the filter cake after 48 hours of soak period in the presence of only HT-BS in brine. | More than 72 hours required for complete clean up of filter cake in the presence of a HT-BS containing SHMP |

Another filtercake breakthrough study was carried out using three test solutions prepared in 8.6 ppg KCl brine at 90° C. Sample 1 contained only HT-BS 15 v/v %; Sample 2 contained HT-BS 15 v/v % and SHMP 7.5 w/v %; and Sample 3 contained HT-BS 15 v/v % and SHMP 10 w/v %. The results are presented in Table 7.

TABLE 7

|  | Only HT-BS | HT-BS with 7.5 w/v % SHMP | HT-BS with 10 w/v % SHMP |
|---|---|---|---|
| Final pH | 2.22 | 2.72 | 2.83 |
| Breakthrough time | 3 hours | 5 hours | 8 hours |
| Observations | Maximum amount of filter cake dissolution observed after breakthrough. Corrosion observed in the test cell which can be seen from the filter cake picture also. | The filter cake breakthrough time delayed and significant amount of filter cake observed on disc after breakthrough test when we use SHMP along with HT-BS in brine. Also, negligible corrosion observed in test cell. | |

The study showed a HT-BS containing the delaying agent, SHMP salt, delayed the filter cake breakthrough time from 3 hours to 8 hours under the indicated conditions.

Example 5

Another filtercake breakthrough study was carried out using two test solutions prepared in 8.6 ppg KCl brine at 110° C. Sample 1 contained only HT-BS 20 v/v % while Sample 2 contained HT-BS 20 v/v % and SHMP 10 w/v %. The results are presented in Table 8.

TABLE 8

|  | Only HT-BS | HT-BS with 10 w/v % SHMP |
|---|---|---|
| Final pH | 2.43 | 2.73 |
| Breakthrough time | 5 hours | 10 hours |
| Weight of disc + Filtercake after drying | 47.47 gm | 52.23 gm |
| Observation | | The filter cake dissolution time delayed at 230° F. by 5 hrs due to presence of SHMP in the HT-BS fluid. |

Example 6

The ability of an HT-BS of the type disclosed herein to act as a corrosion inhibitor was investigated. Two samples were prepared in 8.4 ppg KCl brine. The first sample was a control that contained a only HT-BS in brine while the second sample was an HT-BS of the type disclosed herein containing 10% w/v of SHMP. Coupons of Type 4130 machine-finish steel (chromium-molybdenum alloy steel, considered a low carbon steel) were immersed in the samples. The coupon exposed to only HT-BS sample displayed a high rate of corrosion whereas the coupon in the presence of the delaying agent, lower corrosion rates were observed. Specifically, a coupon weight decreased by 4% in the presence of the HT-BS with SHMP whereas a weight decreases by 9% was observed for only HT-BS. The results are presented in Table 9.

TABLE 9

|  | Only HT-BS | HT-BS with delaying agent |
|---|---|---|
| 9.4 ppg KCl brine | 212.5 ml (85%) | Make up to total 250 ml |
| Breaker solution | 37.5 ml (15%) | 37.5 ml (15%) |
| SUMP | 0 | 25 g (10%) |
| Total volume | 250 mL | 250 mL |
| Initial Coupon Weight, g | 21.3793 | 21.1056 |
| Final Coupon Weight, g | 19.5232 | 21.1056 |
| Final pH | 2.34 | 2.33 |
| Weight Loss, g | 1.8563 | 0.8756 |
| Exposure time, hours | 24 | 24 |
| Test temperature | 90° C. | 90° C. |
| Surface area of Coupon, in$^2$ | 6.35 | 6.35 |
| Coupon density | 7.8 | 7.8 |
| Corrosion rate, mpy | 833.80 | 393.34 |

These results suggest the presence of the delaying agent in the HT-BS may also help reduce the rate of corrosion. The examples indicate that addition of a delaying agent, SHMP salt, to the breaker composition help to delay the filter cake dissolution at any desired temperature.

ADDITIONAL DISCLOSURE

The following are non-limiting, specific embodiments in accordance and with the present disclosure:

A first embodiment which is a breaker composition comprising: (i) an acid precursor, (ii) a delaying agent and (iii) an aqueous fluid wherein the breaker composition has an effective operating temperature range of from about 25° C. to about 180° C.

A second embodiment which is a breaker composition of the first embodiment wherein the delaying agent comprises an inorganic chelating salt, a phosphate or a combination thereof.

A third embodiment which is the breaker composition of the second embodiment wherein the delaying agent comprises sodium hexametaphosphate (SHMP), monosodium phosphate, disodium phosphate, sodium triphosphate, or a combination thereof.

A fourth embodiment which is the breaker composition of any of the first through third embodiments wherein the delaying agent comprises sodium hexametaphosphate.

A fifth embodiment which is the breaker composition of any of the first through fourth embodiments wherein the delaying agent is present in an amount of from about 0.1 wt./vol % to about 30 wt./vol % based on the total weight and volume of the composition.

A sixth embodiment which is the breaker composition of any of the first through fifth embodiments wherein the acid precursor comprises a reactive ester.

A seventh embodiment which is the breaker composition of any of the first through sixth embodiments wherein the acid precursor comprises lactic acid derivatives; esters that are water soluble or partially water soluble; formates that are water soluble or partially water soluble; esters or polyesters of glycerol; esters of acetic acid and glycerol; aliphatic polyesters; poly(lactides); poly(glycolides); poly(ε-caprolactones); poly(hydroxybutyrates); poly(anhydrides); aliphatic polycarbonates; polyphosphazenes; poly(ortho esters); orthoesters; esters of oxalic acid; poly(amino acids); esters of propionic acid; esters of butyric acid; halide esters; esters of nitric acid, sulphuric acid, sulphonic acid, sulphinic acid, phosphoric acid, phosphorous acid, phosphoric acid, phosphonic acid, phosphinic acid, sulphamic acid; derivatives thereof or a combination thereof.

An eighth embodiment which is the breaker composition of any of the first through seventh embodiments wherein the acid precursor is present in an amount of from about 5 vol/vol % to about 30 vol/vol % based on the total volume of the composition.

A ninth embodiment which is the breaker composition of any of the first through eighth embodiments wherein the aqueous fluid comprises a brine.

A tenth embodiment which is the breaker composition of the ninth embodiments wherein the brine comprises KCl, NaCl, NaBr, $CaCl_2$, $CaBr_2$, $ZrBr_2$, sodium formate, potassium formate, cesium formate, or a combination thereof.

An eleventh embodiment which is the breaker composition of any of the first through tenth embodiments wherein the aqueous fluid is present in an amount of from about 40 vol/vol % to about 95 vol/vol % based on the total volume of the composition.

A twelfth embodiment which is a wellbore servicing system comprising (a) an aqueous-based drilling fluid, wherein the aqueous-based drilling fluid forms water-wet solids in the wellbore; and (b) a breaker composition comprising (i) an acid precursor, (ii) a delaying agent and (iii) an aqueous fluid.

A thirteenth embodiment which is the wellbore servicing system of the twelfth embodiment wherein a wellbore temperature ranges from about 25° C. to about 180° C.

A fourteenth embodiment which is the wellbore servicing system of any of the twelfth through thirteenth embodiments wherein the water-wet solids form a filtercake.

A fifteenth embodiment which is the wellbore servicing system of any of the twelfth through fourteenth embodiments wherein the delaying agent comprises an inorganic chelating salt, a phosphate or a combination thereof.

A sixteenth embodiment which is the wellbore servicing system of any of the twelfth through fifteenth embodiments wherein the delaying agent comprises sodium hexametaphosphate (SHMP), monosodium phosphate, disodium phosphate, sodium triphosphate, or a combination thereof.

A seventeenth embodiment which is a method of dissolving a filtercake comprising contacting the filtercake with a breaker solution comprising (i) an acid precursor, (ii) an delaying agent and (iii) an aqueous fluid wherein the filtercake comprises calcium carbonate.

An eighteenth embodiment which is the method of the seventeenth embodiment wherein contacting occurs at a temperature ranging from about 25° C. to about 180° C.

A nineteenth embodiment which is the method of any of the seventeenth through eighteenth embodiments wherein the delaying agent comprises an inorganic chelating salt, a phosphate or a combination thereof.

A twentieth embodiment which is the method of any of the seventeenth through nineteenth embodiments wherein the acid precursor comprises a reactive ester.

A twenty-first embodiment which is the method of any of the seventeenth through twentieth embodiments wherein the aqueous fluid comprises a brine.

The subject matter having been shown and described, modifications thereof can be made by one skilled in the art without departing from the spirit and teachings of the subject matter. The embodiments described herein are exemplary only and are not intended to be limiting. Many variations and modifications of the subject matter disclosed herein are possible and are within the scope of the disclosed subject matter. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as some embodiments of the present disclosure. Thus, the claims are a further description and are an addition to the embodiments of the present invention. The discussion of a reference herein is not an admission that it is prior art to the presently disclosed subject matter, especially any reference that may have a publication date after the priority date of this application. The disclosures of all patents, patent applications, and publications cited herein are hereby incorporated by reference, to the extent that they provide exemplary, procedural or other details supplementary to those set forth herein.

We claim:

1. A breaker composition comprising: (i) an acid precursor, (ii) a delaying agent comprising an inorganic chelating salt, a phosphate or a combination thereof and (iii) an aqueous fluid wherein the breaker composition has an effective operating temperature range of from about 25° C. to about 180° C.,
wherein the delaying agent is present in an amount of from about 2 wt./vol. % to about 25 wt./vol. %.

2. The breaker composition of claim 1 wherein the delaying agent comprises sodium hexametaphosphate (SHMP).

3. The breaker composition of claim 1 wherein the delaying agent comprises monosodium phosphate, disodium phosphate, sodium triphosphate, or a combination thereof.

4. The breaker composition of claim 1 wherein the delaying agent comprises the combination of the inorganic chelating salt and the phosphate.

5. The breaker composition of claim 1 wherein the acid precursor comprises a reactive ester, the delaying agent comprises sodium hexametaphosphate (SHMP), and the aqueous fluid comprises a brine, comprising KCl or NaBr.

6. The breaker composition of claim 1 wherein the acid precursor comprises lactic acid derivatives; esters that are water soluble or partially water soluble; formates that are water soluble or partially water soluble; esters or polyesters of glycerol; esters of acetic acid and glycerol; aliphatic polyesters; poly(lactides); poly(glycolides); poly(ε-caprolactones); poly(hydroxybutyrates); poly(anhydrides); aliphatic polycarbonates; polyphosphazenes; poly(ortho esters); orthoesters; esters of oxalic acid; poly(amino acids); esters of propionic acid; esters of butyric acid; halide esters; esters of nitric acid, sulphuric acid, sulphonic acid, sulphinic acid, phosphoric acid, phosphorous acid, phosphoric acid, phosphonic acid, phosphinic acid, sulphamic acid; derivatives thereof or a combination thereof.

7. The breaker composition of claim 1 wherein the acid precursor is present in an amount of from about 5 vol./vol. % to about 30 vol./vol. % based on the total volume of the composition.

8. The breaker composition of claim 1 wherein the aqueous fluid comprises a brine.

9. The breaker composition of claim 8 wherein the brine comprises KCl, NaCl, NaBr, $CaCl_2$), $CaBr_2$, $ZrBr_2$, sodium formate, potassium formate, cesium formate, or a combination thereof.

10. The breaker composition of claim 1 wherein the aqueous fluid is present in an amount of from about 40 vol./vol. % to about 95 vol./vol. % based on the total volume of the composition.

11. A wellbore servicing system comprising:
   (a) an aqueous-based drilling fluid, wherein the aqueous-based drilling fluid forms water-wet solids in the wellbore; and
   (b) a breaker composition comprising (i) an acid precursor, (ii) a delaying agent comprising an inorganic chelating salt, a phosphate or a combination thereof, and (iii) an aqueous fluid,
   wherein the delaying agent is present in an amount of from about 2 wt./vol. % to about 25 wt./vol. %.

12. The wellbore servicing system of claim 11 wherein a wellbore temperature ranges from about 25° C. to about 180ºC.

13. The wellbore servicing system of claim 11 wherein the water-wet solids form a filtercake.

14. The wellbore servicing system of claim 11 wherein the acid precursor comprises a reactive ester, the delaying agent comprises sodium hexametaphosphate (SHMP), and the aqueous fluid comprises a brine, comprising KCl or NaBr.

15. The wellbore servicing system of claim 11 wherein the delaying agent comprises monosodium phosphate, disodium phosphate, sodium triphosphate, or a combination thereof.

16. A method of dissolving a filtercake comprising:
   contacting the filtercake with the breaker composition of claim 1 comprising (i) an acid precursor, (ii) a delaying agent and (iii) an aqueous fluid wherein the filtercake comprises calcium carbonate.

17. The method of claim 16 wherein contacting occurs at a temperature ranging from about 25° ° C. to about 180ºC.

18. The method of claim 17 wherein the delaying agent comprises sodium hexametaphosphate (SHMP).

19. The method of claim 16 wherein the acid precursor comprises a reactive ester.

20. The method of claim 16 wherein the aqueous fluid comprises a brine.

21. The breaker composition of claim 1 wherein the delaying agent is present in an amount of from about 2 wt./vol. % to about 20 wt./vol. % based on the total weight and volume of the composition.

* * * * *